United States Patent [19]

Day

[11] 3,711,778

[45] Jan. 16, 1973

[54] MICROWAVE MICROCIRCUIT

[75] Inventor: William B. Day, Dunedin, Fla.

[73] Assignee: Sperry Rand Corporation

[22] Filed: March 18, 1970

[21] Appl. No.: 20,763

[52] U.S. Cl. ................................325/446, 333/84 M

[51] Int. Cl. ..............................................H04b 1/16

[58] Field of Search ......325/445, 446, 442; 333/735, 333/10, 34, 84 M; 317/234 R; 329/116, 160, 162

[56] References Cited

UNITED STATES PATENTS

| | | | |
|---|---|---|---|
| 3,278,763 | 10/1966 | Grove | 333/34 |
| 3,310,747 | 3/1967 | Anderson | 325/445 |
| 3,437,935 | 4/1969 | Webb | 325/446 |
| 3,512,091 | 5/1970 | Blixt et al. | 325/446 |
| 3,310,748 | 3/1967 | Putnam | 325/446 |
| 3,566,315 | 2/1971 | Vinding | 330/735 |

*Primary Examiner*—Albert J. Mayer
*Attorney*—S. C. Yeaton

[57] ABSTRACT

A high frequency or microwave microcircuit device is disclosed having application as an integrated circuit element for electromagnetic signal frequency conversion performing, for example, frequency conversion functions such as signal mixing or signal detection. The novel microcircuit element is particularly adapted for use in planar integrated microstrip transmission line systems.

1 Claim, 2 Drawing Figures

PATENTED JAN 16 1973 3,711,778

INVENTOR
WILLIAM B. DAY
BY
ATTORNEY

MICROWAVE MICROCIRCUIT

BACKGROUND OF THE INVENTION

1. Field of the Invention

The invention pertains to microcircuit elements of the type adaptable for use, for instance, in microstrip transmission line systems in combination with semiconductor and ferrimagnetic circuit elements suitable for employment in microwave receivers and in other complex microwave systems that are compact in size, light in weight, and inexpensive of manufacture. More particularly, the invention relates to transmission line detector and signal mixer circuits adapted for operation with microwave or very high frequency carrier signals and in particular adaptable for use in planar or other circuit configurations bonded to dielectric substrates.

2. Description of the Prior Art

The electronic industry has moved, because of the ever increasing complexity and diversity of microwave and other high frequency systems, to find circuit elements and system configurations smaller, more reliable, and less costly than have been achieved in the past with discrete microwave components. The move has been away from assembling expensive, hand-tailored discrete components and toward making integrated microcircuit systems where many components can be fabricated simultaneously along with the fabrication of the basic transmission line circuits of the system.

The basis for most microwave integrated circuit designs is the well known planar microstrip transmission line which uses a sheet of high dielectric constant material as a substrate. A transmission line conductor may be applied to one side of the dielectric sheet and a ground plane of copper or other electrically conductive material to the other side. While microstrip has been the popular planar type of transmission line, it is to be understood in the following discussion that other types of transmission lines are used with planar dielectric substrates, such as the balanced strip, the suspended substrate (shield or laminated microstrip), the slot line, the H-guide, and the co-planar types of transmission line. It is further to be understood that the present invention is applicable to use in cooperation with such transmission lines. While the discussion which follows is in terms of use of the invention with microstrip or strip transmission lines, it may also readily be used with other types of prior art transmission lines, including those mentioned above.

Among microwave circuit elements which have been transformed from discrete designs and modified for use in planar microcircuits are frequency converters such as microwave signal detectors and signal mixers. In the construction of low pass filters for use in combination in such detector and mixer systems, it is often necessary to provide a very low impedance between the transmission line element and ground, while at the same time providing isolated current paths for the supply of diode bias voltages and for the outward flow of intermediate frequency or detected signals. It has, however, been the experience with prior art approaches to the problem that relatively high losses prevail, along with poor signal conversion efficiency. Suitable isolation between input and output ports has not readily been achieved. Even when acceptable values of loss and isolation are attained, such result only over a relatively small band of carrier frequencies. It is observed that limitations inherent in chemical processes for fabricating high impedance planar transmission lines impose a fundamental barrier to finding improved solutions.

SUMMARY OF THE INVENTION

The invention is a high frequency or microwave planar integrated circuit for performing frequency conversion functions such as signal mixing or detection. The invention provides in such signal conversion systems greatly improved means for providing a desirably very low impedance path between the microstrip or other high frequency transmission line and ground so that coupling of high frequency energy to low frequency circuits of the signal converter is substantially eliminated. At the same time, the invention provides isolated current paths of maximum effectiveness for the supply of diode bias voltages and, similarly, supplies efficient paths for the delivery of useful detected or converted signals to utilization apparatus. Maximum isolation between input and output ports is achieved with enhanced operational band width by employment of a novel low pass transmission line filter system comprising a cooperating radial transmission line section and a transmission line section suspended above the microcircuit. Minimum undesired interaction of electromagnetic fields among the various circuit paths is thus achieved.

DESCRIPTION OF THE PREFERRED EMBODIMENT

Figure 1:
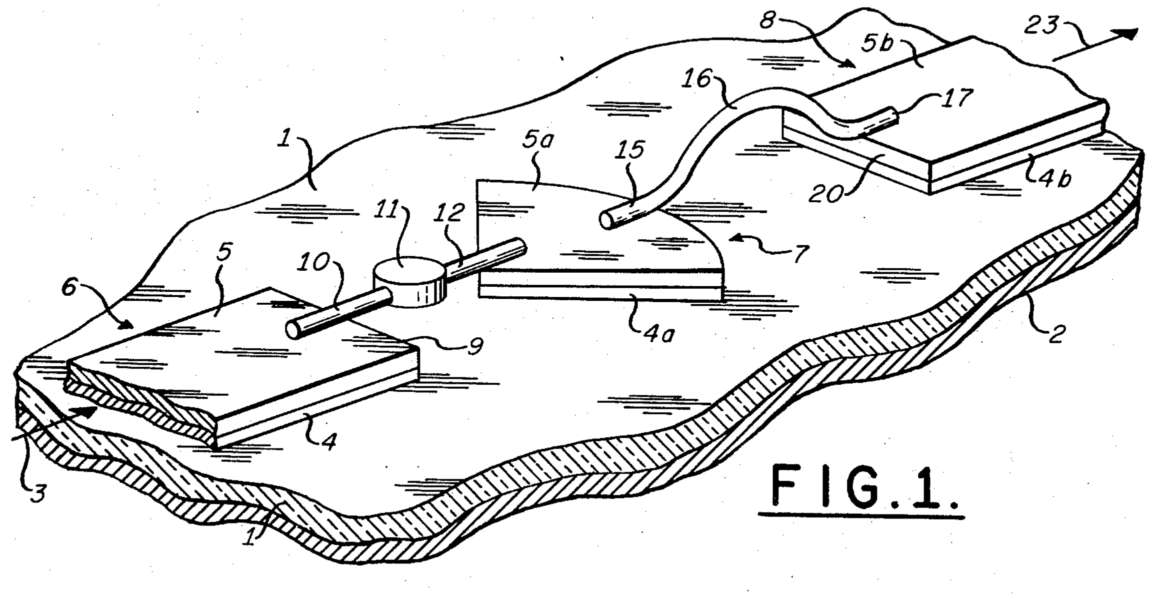
FIG. 1 is an isometric view, partly in section, of a preferred form of the invention.

In FIG. 1, there is shown a microstrip transmission line circuit useful at microwave or other very high carrier frequencies as an electromagnetic energy frequency converter for performing, for example, frequency conversion functions such as signal mixing or signal detection. The transmission line circuit per se comprises in FIG. 1 at least a dielectric substrate 1 to one surface of which a relatively thin conductive ground sheet 2 may be bonded in any well known manner. For example, sheet 2 may be formed on one surface of substrate 1 by evaporation in a vacuum chamber from a heated source for distilling a desired electrically conductive metal, or by chemical or by other known metal plating methods for forming a highly electrically conducting metal layer of silver or gold of a thickness of several skin depths.

The transmission line elements opposite ground plate 2 comprise planar or microstrip transmission line and other circuit elements bonded to a second or upper surface of substrate 1. Adjacent the microwave signal input denoted by arrow 3, for example, the upper transmission line element 6 includes a layer 4 of a metal which forms a strong bond to the material of dielectric substrate 1. It is also selected to have the property of forming a strong bond to a metal to be plated over it, such as that of metallic layer 5.

According to the invention, evaporated chromium, which establishes a firm bond with the dielectric material, is selected for use as layer 4, while evaporated gold, which in turn forms a firm bond with evaporated chromium, is used for the upper layer 5 since it affords a surface highly conducting for microwave and other electrical signals. Silver or other good electrical conductors may be used. It is to be understood that the thicknesses of evaporated layers 4 and 5 as shown in FIG. 1 are grossly exaggerated for convenience, as they are actually thin in comparison to the thickness of substrate 1. The width of the conducting layer 5 of the microcircuit element 6 is determined by the usual standards which must be met for the energy propagating in the transmission line to be firmly bonded thereto and to propagate substantially in the TEM mode. It will be understood that conductive sheet 2 may be formed similarly of layers of chromium and gold.

It is to be understood that substrate 1 may be extended in any direction to support additional active or passive microcircuit or other circuit elements in any combination desired to furnish the input 3 to the inventive elements shown in FIG. 1. The dielectric material of substrate 1 may consist of a 99.5 percent aluminum oxide ceramic or of other similar ceramics. Certain ferrimagnetic materials may also be used such as 100 percent yttrium iron garnet. In general, a ceramic material is required having physical properties which will withstand the temperatures used in evaporating the material of the circuits on to the ceramic surface. Also, the dielectric loss tangent should be 0.001 or better. In general, it is the practice to require that the surface of the substrate 1 supporting microcircuit elements have a surface finish between 5 to 25 micro-inches and that the two surfaces of the material be parallel to each other within 0.0005 inches. The over all size and thickness of substrate 1 also depends somewhat upon the circuit that is to be fabricated on it, and upon the carrier frequency at which it will operate. A typical thickness used in operating circuits of the type shown in FIG. 1 has varied from 0.025 to 0.055 inches for an operating wave length, for example, of 4 centimeters.

Diode 11, which is formed with opposed leads 10 and 12, functions as the active element in the mixing or detection function of the circuit, as will be explained in more detail. Suitable diodes with leads of satisfactory type are available on the market, including, for instance, chip or certain beam-lead silicon Schottky barrier diodes such as the type 5082–2740 diode manufactured by Hewlett-Packard. As seen in FIG. 1, lead 10 of diode 11 is fastened adjacent the end 9 of transmission line 6, for instance, by a known pulse-weld technique as will be further discussed herein. Diode lead 12 is similarly fastened adjacent the apex 15 of radial transmission line segment 7. It is to be understood that energy utilizing elements other than diodes may be used in place of diode 11. Such other energy utilizing elements may include devices such as a thermistor bead, a barretter wire, or other simple resistive elements.

Radial transmission line 7 is similar in construction to transmission line 6, especially in that radial line 7 is comprised of a layer **4*a* of chromium bonded by evaporation to the upper face of substrate 1 and an over-layer 5*a* of evaporated gold or of a similar electrically conductive material. Radial transmission line 7 is a sector-shaped transmission line element serving as a low pass filter, its function being to provide a low impedance path for microwave or other such high frequency carrier signals to the ground plane 2**.

To the upper surface of radial transmission line device 7 in a substantially central location is affixed by pulse-welding the end 15 of a gold or aluminum wire 16 arched so as to be disposed to extend well above the plane of microstrip lines 6 and 7. Wire 16 is non-resonant and is connected also to planar output conductor 8. Wire 16 may be a quarter wave in length for the median carrier signal, though its high impedance level remains satisfactory over a broad frequency range so that the wire 16 affords acceptable filter action from one-eighth or less to substantially three-eighths wave lengths. The impedance level of the wire 16 is high with respect to the microwave or other carrier signal, being on the order of 250 ohms for a wire 0.001 inches in diameter, for example.

Output conductor 8 may, as a matter of convenience, be constructed similarly to transmission line 6, especially in that conductor 8 may consist of a layer **4*b* of chromium bonded by evaporation to the upper face of substrate 1 and an over-layer 5*b* of gold. As noted above, high impedance wire 16 is bonded at 17 adjacent the end 20 of output conductor 8. It is to be understood that substrate 1 may be extended in any direction to support additional active or passive circuit elements in any combination desired to utilize the output 23 of planar conductor 8**.

In generating the structure of FIG. 1, the substrate 1 dielectric material is brought to a proper size and surface finish by conventional grinding and lapping techniques. It is then cleaned in a conventional ultrasonic cleaner for five minutes in the presence of a strong detergent. After rinsing in distilled water at room temperature, it is washed in methyl alcohol and is then dipped into a hot trichloroethylene solution. The substrate is now ready for deposit of the chromium and gold layers.

In order to deposit the chromium layers 4, **4*a*, 4*b*, substrate 1 is placed in a vacuum envelope which can provide a pressure held reliably at $1\times10^{-5}$ Torr. After evacuation of the chamber, the substrate is heated to approximately 270°C. A chromium-plated tungsten filament already mounted in the vacuum chamber is electrically heated by passing a high current through it; thus, deposition of chromium distilling from the filament on to the substrate begins. As has been observed, the desired thickness of the chromium film is simply that which yields a firm bond to substrate 1. In practice, the thickness of the chromium layers 4, 4*a*, 4*b* may vary from 200 to 1,500Angstroms, since the thickness will vary dependent upon the surface finish of substrate 3**.

The amount of chromium deposited is determined in a conventional manner by observing a monitor meter. For monitoring purposes, an independent substrate surface is provided in the vacuum chamber having the same surface finish as the product substrate. A pair of electric conductors is fastened at opposed locations on the substrate and is led outside of the vacuum chamber to the resistance monitor. Thus, with the chromium films on the product substrate and on the monitor substrate growing at equal rates, the operator may determine the desired thickness of the chromium layer 4, **4*a*, 4*b*** on the product substrate simply by observing the indication of the calibrated resistance monitor meter.

At the conclusion of the deposition of the chromium layers 4, 4*a*, 4*b*, a thin layer of gold is deposited over the chromium surfaces. This is done to prevent oxidation of the chromium surface after it is removed from the vacuum chamber. Such is accomplished by an independent current supply with electrodes in the vacuum chamber to which are fastened a tungsten boat. A small piece of gold wire is placed in the tungsten boat which is then heated by passing a very high current through it. As a consequence of the above steps, the thin layers 4, 4*a*, 4*b* of chromium are bonded to a surface of substrate 1 and thin layers of gold 5, 5*a*, 5*b* are placed over the respective chromium layers. As noted, the chromium layers need be only thick enough to furnish the desired bond between the dielectric material of substrate 1 and the adjacent surface of gold layers 5, 5*a*, 5*b*. The initial gold layer is on the order of 3,000 to 4,000 Angstroms in thickness.

The next steps in the fabrication of the microcircuit of FIG. 1 are conventional photographic processes successively performed in a dark room in the presence of a weak yellow light only. For this, the substrate with its chromium and thin gold layers is again washed in trichloroethylene and dried in an oven for 5 minutes at 60°C., being then allowed to cool to room temperature. As is conventional practice in applying photographic masking materials, such as materials of the type sold by the Eastman Kodak Company and called ortho-resists, the substrate is placed on a vacuum jig which rotates about a vertical axis at about 2,000 r.p.m. With the substrate 1 in a horizontal position, ortho-resist material is applied at the spin center of the substrate and it is then allowed to spin for 30 seconds. After drying in an oven for 5 minutes at 60°C., the substrate is ready for the subsequent printing process.

A previously prepared negative conforming in the usual manner to the final planar circuit to be formed on substrate 1 is placed in a holder aligned and parallel with the substrate. A print is then made from the negative and is developed by conventional procedures, leaving a contacting print on the surface of substrate 1. After the modified substrate is baked for 5 minutes in an oven at 125°C., the assembly is ready for etching.

The first step in the etching process is to protect the back or ground conducting plane 2 from the etchant by applying any suitable material which will prevent the etchant from contacting the ground plane. The assembly is then etched, first with any suitable gold etchant and then with any suitable chromium etchant. When the etchant materials are removed by appropriate solvents, the structure left behind looks like that of FIG. 1, except that diode 11 and wire 16 are not yet in place.

In the final steps, conductors 5, 5*a*, and 5*b* are coated with additional gold to a permanent thickness on the order of 6 to 8 microns. Such a thickness is, of course, considerably greater than the skin depth of the microwave energy propagating in the gold-covered transmission line 6, so that the chromium layers 4, 4*a*, and 4*b* do not introduce loss wherever covered by gold. In the final steps, the product device is washed in a conventional manner to remove traces of etchant, and other undesirable material, such as any remaining masking materials, is also removed by conventional processes. It is understood that the practice of the method described above may be modified in some detail and a successful product will still result. However, experience has taught that the described method reliably yields a superior product.

Diode 11 and high impedance wire 16 may be affixed in the circuit by conventional soldering or other fastening methods. A preferred method, for instance, for fastening wire 16 to gold layers 5*a* and 5*b* is by use of pulse-weld technique which discharges a controlled pulse of electrical energy through a split welding anode to bond the end 25 of wire 16 to layer 5*a*, for example. Ultrasonic or other micro-bonding techniques can also be used.

The novel structure of FIG. 1 provides a microwave carrier modulation detecting microcircuit providing a very low impedance for carrier signals between the planar transmission line 5 and the ground plane 2 via sector-shaped radial transmission line 7. At the same time, a path is provided between planar circuit 8 and line 6 from a conventional unidirectional bias voltage source (not shown) to supply the necessary bias voltage across diode 11. While radial transmission line 7 and the wire connector 16 also represent a useful high impedance to the passage of microwave carrier currents to conductor 8, wire 16 readily conducts detected intermediate frequency or lower frequency signals to conductor 8 to yield a useful output 23. Thus, all of the high frequency energy is coupled to diode 11 or other energy absorbing device and virtually none is conducted to bias or intermediate frequency ports. Bias current reaches diode 11 through wire 16 by an arched or extended path about which high frequency fields are small. Wire 16 is coupled to the top surface of layer 5*a* of radial line 7 where the high frequency fields are very small. The combination, therefore, acts as a low pass filter, conducting the diode bias and intermediate frequency currents with little attenuation, while substantially prohibiting the passage of high frequency carrier currents out of conductor 8 in the sense of arrow 23. Low loss is achieved with improved isolation between the input and output ports of the circuit, as increased operating band width.

From the foregoing discussion, it should also be apparent that FIG. 1 is drawn with the successive elements 5, 11, 7, 16, and 8 along a common axis merely as a matter of convenience. It will be seen upon comparison of FIGS. 1 and 2 that other angular relations are possible between elements 5, 11, 7, 16, and 8.

A typical circuit like that of FIG. 1 and designed for operation in the frequency band bounded by 8.0 and 12.0 GHz. employs an input transmission line substantially 0.025 inches wide with a radial line sector having a radius of about 0.10 inches. The high impedance wire 16 is substantially 0.001 inches in diameter and effectively 0.19 inches in length. Output conductor 8 is conveniently 0.025 inches wide. With such dimensions, it is reasonable to observe that the radial sector line 7 is effectively one quarter of a wave in radius and the bridging wire 16 is effectively one quarter of a wave in length, both at 10 GHz.

A comparable circuit representing prior art techniques might characteristically employ an input planar transmission line like line 5, a diode element 11 or its equivalents, and a combination intermediate frequency output and bias connector like planar connector 8. Prior art symmetric quarter wave stubs would project perpendicular to the lead 12 of diode 11. From one edge of the stub structure would continue an etched high impedance line bonded to substrate 1 and directly connected to conductor 8. This etched high impedance line as is conventionally used in the prior art would also be substantially one quarter wave long, for instance, at 10 GHz. The impedance of such a line etched directly on the surface of substrate 1 is positively limited by the ultimate limits of the photographic processes normally used in preparing microcircuit elements.

For example the minimum width conductor attainable with currently available photographic techniques is perhaps on the order of 0.002 inches. A transmission line conductor 0.002 inches wide on a 0.025 inch thick dielectric substrate has a characteristic impedance only about 100 ohms. On the other hand, the characteristic impedance of a representative wire 16 that is 0.001 inches in diameter is substantially 250 ohms, as noted previously. On this basis alone, wire 16 is much more effective in rejecting high frequency carrier energy. In addition, the novel connection to conducting surface 5a of radial line sector 7 shields wire 16 from carrier fields and the elevation of wire 16 above the plane of section 7 further decreases the coupling of wire 16 to those carrier fields. Such is not the case with the prior art circuit, as fringing carrier energy fields therein readily couple to closely situated planar conductors. Such is borne out experimentally by observations of improvement on the order of substantially 6 db. in isolation between the input and output ports of the circuit of FIG. 1 over prior art stub-line circuits operating in the 8.0 to 11.0 GHz band.

Figure 2:
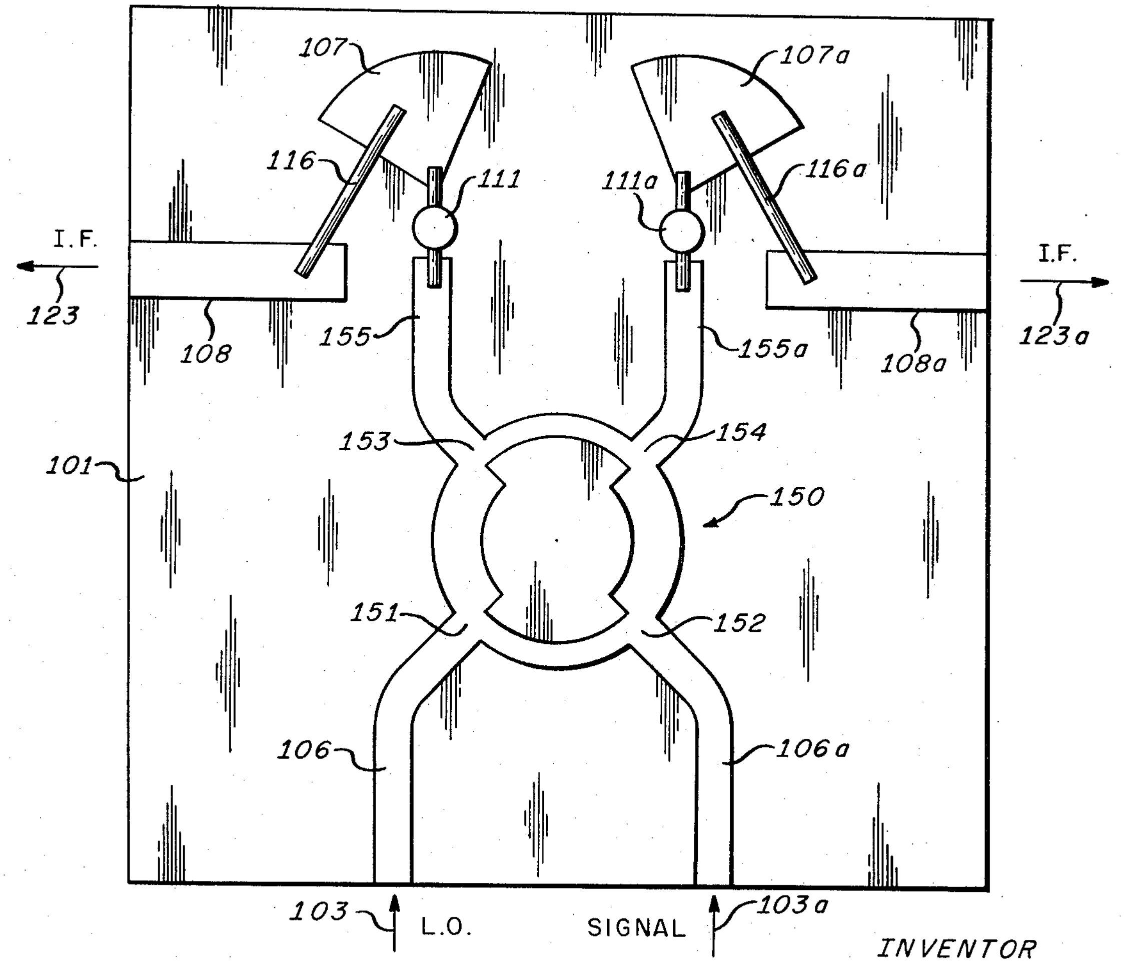
FIG. 2 is a plan view of a second embodiment of the invention.

FIG. 2 illustrates an application of the invention to signal mixing, such as a planar balanced mixer microcircuit formed by substantially the same vacuum distillation and other steps described in connection with the signal detector circuit of FIG. 1. In FIG. 2, two planar input microcircuit lines 106 and 106a are provided on substrate 1. Line 106 accepts signals 103 from a microwave or high frequency local oscillator (not shown). Likewise, line 106a accepts signals 103a which may be modulated carrier signals. Lines 106 and 106a are joined to respective ports 151 and 152 of a planar directional coupler 150.

Directional coupler 150 is, for example, a multiple port, 3 db. coupler of a type described in the literature as compatible for use in microstrip transmission line circuits and as having a symmetric and small configuration. The coupler 150 has, for example, been demonstrated to provide isolation between inputs 151 and 152 of substantially 20 db. and to provide substantially equal output levels at its opposite ports 153 and 154.

For example, at port 153, the local oscillator and signal frequencies 103 and 103a both appear and flow along planar transmission line 155. Diode 111 spans the gap between the end of line 155 and the apex region of radial transmission line 107, the latter serving the same role as radial transmission line 7 of FIG. 1 by providing a low impedance path for microwave or carrier signals to a ground plate (not shown) on the underneath side of substrate 1.

Affixed at one of its ends on a central region to the top surface of radial transmission line 107, high impedance line 116 arches above the plane of line 107 and is affixed at its opposite end to the surface near the inner end of planar conductor 108. Signals flowing out of conductor 108 are modulated intermediate frequency signals 123.

Similarly, at port 154, the respective local oscillator and signal frequencies 103 and 103a both appear and flow along transmission line 155a. Diode 111a spans the gap between line 155a and the apex region of radial transmission line 107a. Diode 111 is normally reversed in polarity with respect to diode 111a. The radial transmission line 107a again serves to provide a low impedance path for microwave or carrier signals to the common ground conductor on the back side of dielectric substrate 1.

Line 116a, serving as a high impedance element for microwave or carrier signals but as a good conductor of intermediate frequency signals, has one of its ends joined at the center of the top surface of radial transmission line element 107a, then arches above the plane of line 107a, and is joined at its opposite end to planar intermediate frequency output conductor 108a. Signals 123a flowing out of conductor 108a are again modulated intermediate frequency signals.

In operation, substantially equal amplitude and cophasal intermediate frequency signals appear on conductors 108 and 108a. These useful output signals 123 and 123a may be directly added by certain combining circuits conventionally used to combine such outputs of balanced mixer circuits. Similarly, unidirectional bias voltages for application across diodes 111 and 111a may be fed through conductors 108 and 108a in well known fashion. Furthermore, known image frequency rejection techniques may readily be employed in FIG. 2 to reduce conversion loss and to prevent the escape of image signals through the local oscillator arm 106 and the signal arm 106a. For example, with properly adjusted band rejection filter means not an essential part of the present invention placed in the transmission lines 155 and 155a between the respective diodes 111, 111a and directional coupler 150, image frequency energy is reflected back into diodes 111 and 111a and is reconverted into desired intermediate frequency energy, improving operating efficiency of the mixer.

It is seen that the novel embodiments of FIGS. 1 and 2 represent improved compact systems for performing high frequency signal conversion with improved minimally low impedance paths for high frequency signals. Thus, coupling of such high frequency signals to low frequency circuit paths of the high frequency converter is strongly reduced. At the same time, the isolated low frequency current paths are made highly effective for the delivery of converted signals to utilization apparatus and for the supply of necessary bias voltages to the semiconductor diodes which are the active converter elements. Maximum isolation between input and output ports is achieved over a broad band of carrier frequencies.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A microcircuit comprising a substrate of low-loss dielectric material having first and second surfaces, electrically conductive ground layer means bonded to said first surface, electrically conductive circuit means bonded to said second surface and having input circuit means for propagating high frequency energy, radial transmission line circuit means for coupling said high frequency energy to said ground layer, and output circuit means, said radial transmission line circuit means comprising a sector-shaped planar transmission line device having an apex and a radius substantially one quarter of a wave length in dimension, where wave length is substantially the median operating high frequency wave length, barrier diode frequency converter means coupled between said input circuit means and said apex of said radial transmission line circuit means, and shaped electrical conductor means adjoining said radial transmission line circuit means to said output circuit means and extending substantially above the plane of said electrically conductive circuit means for propagating converted frequency energy into said output circuit means, said shaped electrical conductor means being joined to the outer sector-shaped surface of said sector-shaped planar transmission line device substantially at a point characterized by minimum high frequency fields and having a high impedance to said high frequency electric fields, said radial transmission line circuit means and said shaped electrical conductor means forming a low pass filter against high frequency signals, permitting only frequency converted signals to pass to said output circuit means.

* * * * *